US011372713B1

(12) United States Patent
Kumar (10) Patent No.: US 11,372,713 B1
(45) Date of Patent: Jun. 28, 2022

(54) BACKUP WORKLOAD PREDICTION AND NOTIFICATION FOR STORAGE SYSTEMS

(71) Applicant: EMC IP Holding Company LLC, Hopkinton, MA (US)

(72) Inventor: Sunil Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/147,822

(22) Filed: Jan. 13, 2021

(51) Int. Cl.
*G06F 11/07* (2006.01)
*G06F 3/06* (2006.01)

(52) U.S. Cl.
CPC ......... *G06F 11/0793* (2013.01); *G06F 3/065* (2013.01); *G06F 3/0619* (2013.01); *G06F 3/0673* (2013.01); *G06F 11/076* (2013.01); *G06F 11/0727* (2013.01); *G06F 11/0772* (2013.01)

(58) Field of Classification Search
CPC .. G06F 11/0793; G06F 11/0727; G06F 3/065; G06F 3/0619; G06F 3/0673; G06F 11/076; G06F 11/0772
See application file for complete search history.

(56) References Cited

U.S. PATENT DOCUMENTS

| 2014/0052694 | A1* | 2/2014 | Dasari | G06F 16/23 |
| | | | | 707/654 |
| 2017/0060694 | A1* | 3/2017 | Makhov | G06F 16/113 |
| 2017/0364415 | A1* | 12/2017 | Formato | G06F 11/1464 |
| 2018/0232162 | A1* | 8/2018 | Bode | G06F 11/1446 |
| 2020/0313979 | A1* | 10/2020 | Kumaran | H04L 41/142 |
| 2021/0200654 | A1* | 7/2021 | Elmtalab | G06F 11/0793 |

OTHER PUBLICATIONS

Dell EMC, "XtremIO v6.0 Specifications," Specification Sheet, 2017, 4 pages.
Dell EMC, "PowerMax OS," Dell EMC PowerMax Family Product Guide, May 2019, 192 pages.
Dell EMC, "Dell EMC Unity: Virtualization Integration," Technical White Paper, Oct. 2019, 39 pages.
Dell EMC, "Dell EMC PowerMax: iSCSI Implementation for Dell EMC Storage Arrays Running PowerMaxOS," Technical White Paper, Sep. 2019, 35 pages.

(Continued)

*Primary Examiner* — Jigar P Patel
(74) *Attorney, Agent, or Firm* — Ryan, Mason & Lewis, LLP (57) ABSTRACT

Techniques disclosed herein provide for improved backup copy management in an information processing system. For example, a method comprises obtaining a set of one or more values representing a backup plan factor respectively corresponding to a set of one or more storage systems upon which data associated with the execution of application programs on one or more host servers coupled to the set of storage systems is stored. The method compares the obtained set of one or more values with a set of one or more threshold values. The method predicts whether a scheduled backup plan corresponding to each of the set of one or more storage systems is likely to fail based on a result of comparing the obtained set of one or more values with the set of one or more threshold values.

20 Claims, 6 Drawing Sheets

(56) References Cited

OTHER PUBLICATIONS

Dell EMC, "Introduction to Dell EMC XtremIO X2 Storage Array—A Detailed Review," Dell EMC White Paper, Apr. 2018, 52 pages.
Dell Technologies, "Dell EMC CloudIQ: A Detailed Review," Technical White Paper, Nov. 2020, 106 pages.
Dell Technologies, "Dell EMC PowerProtect Data Manager," Data Sheet, 2020, 2 pages.
Dell Technologies, "AppSync," Data Sheet, 2020, 3 pages.

* cited by examiner

| AppID | LUNID | StorageSystem ID |
|---|---|---|
| HRDB | LUN1 | PMAXSYS1 |
| HRDB | LUN99 | PMAXSYS8 |
| FINDB | LUN23 | PMAXSYS1 |
| OPDB | LUN29 | PMAXSYS1 |
| OPDB | LUN21 | PMAXSYS1 |

| StorageSystemID | No. of Storage Unit(s) |
|---|---|
| PMAXSYS8 | 1 |
| PMAXSYS1 | 4 |

| StorageSystem ID | StartTime | BackupFactor |
|---|---|---|
| PMAXSYS1 | T1 on DD1MMYYYY | 20 |
| VNXSYS2 | T2 on DD2MMYYYY | 5 |
| : | : | : |
| : | : | . |

BACKUP WORKLOAD PREDICTION AND NOTIFICATION FOR STORAGE SYSTEMS

FIELD

The field relates generally to information processing systems, and more particularly to storage in information processing systems.

BACKGROUND

Storage arrays and other types of storage systems are often shared by multiple host devices over a network. Such information processing systems are often times referred to as data centers. In a data center, applications running on the host devices typically each include one or more processes that perform the application functionality. The processes issue input-output (IO) operations for delivery over paths from the host devices to storage ports of a storage system.

In current data centers, it is very common to have multiple storage systems and hundreds of enterprise applications (e.g. mailboxes, databases, datastores, etc.) storing their data on these storage systems. To maintain continuity, copy data management (CDM) or backup systems rely on point-in-time copy (snapshot) services built into these storage systems. Typically, snapshots are very efficient and quick to create, and present little to no challenges to the production workload. However, in certain scenarios due to improper scheduling of backup and expiry of jobs, storage systems can be burdened with creating/expiring several hundreds or thousands of snapshots at or near the same time which impacts production as well as backup performance. Oftentimes, this leads to failures of backup jobs and crashes of management servers which are unable to handle such extreme/peak workload scenarios.

SUMMARY

Illustrative embodiments provide techniques for improved backup copy management in an information processing system.

For example, in one illustrative embodiment, a method comprises obtaining a set of one or more values representing a backup plan factor respectively corresponding to a set of one or more storage systems upon which data associated with the execution of application programs on one or more host servers coupled to the set of storage systems is stored. The method compares the obtained set of one or more values with a set of one or more threshold values. The method predicts whether a scheduled backup plan corresponding to each of the set of one or more storage systems is likely to fail based on a result of comparing the obtained set of one or more values with the set of one or more threshold values.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments enable detecting extreme/peak snapshot management scenarios in advance based on backup workload prediction and notifying an entity to take action to avoid failure conditions.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
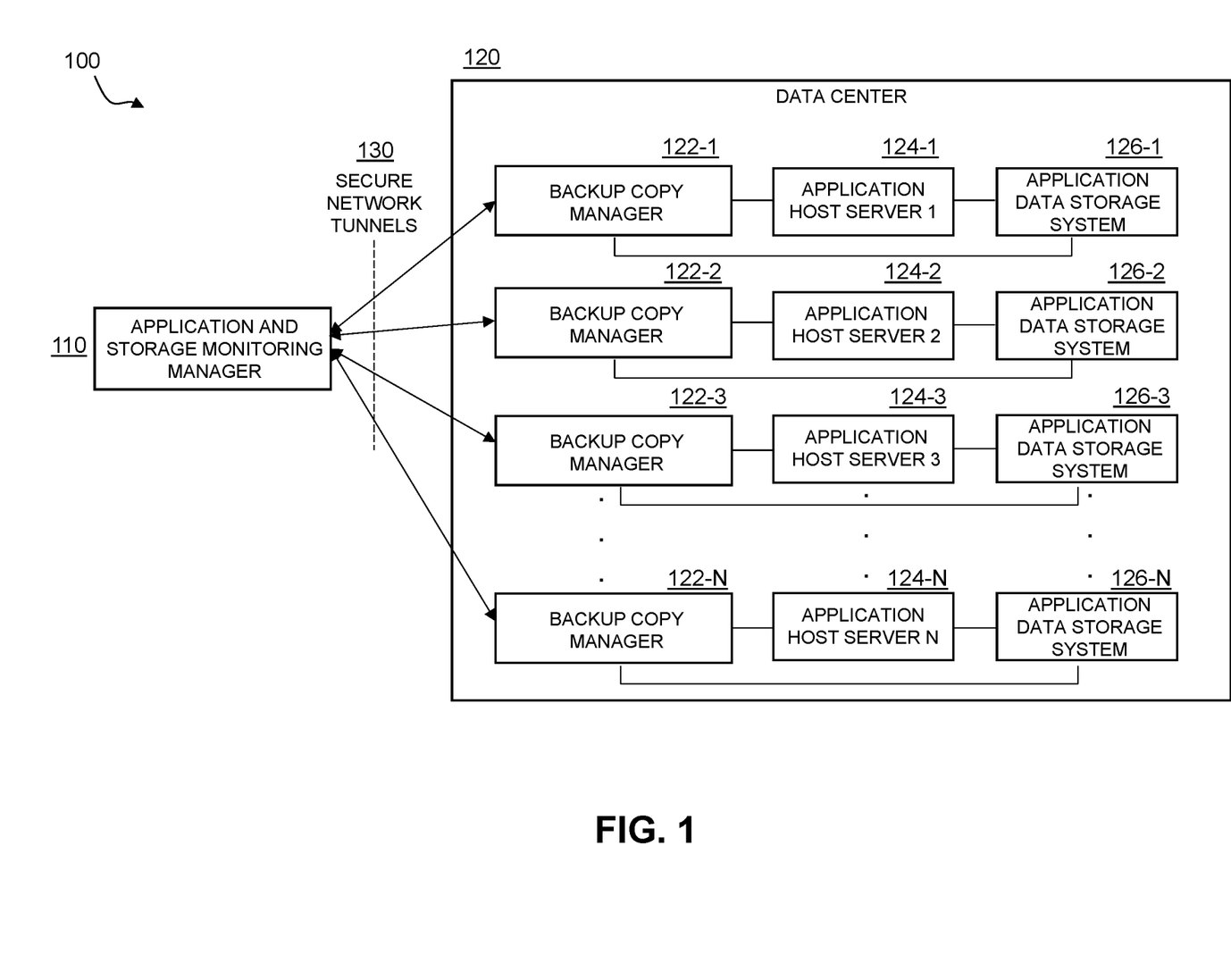
FIG. 1 illustrates an information processing system configured to implement backup workload prediction and notification functionalities according to an illustrative embodiment.

FIG. 1 depicts an information processing system 100 configured to implement backup workload prediction and notification functionalities according to one or more illustrative embodiments. As shown, information processing system 100 comprises an application and storage monitoring manager 110 operatively coupled to a data center 120. The data center comprises a set of backup copy managers 122-1, 122-2, 122-3, . . . , 122-N (collectively referred to as backup copy managers 122 or individually as backup copy manager 122). The backup copy managers 122 are operatively coupled to application and storage monitoring manager 110 via respective secure network tunnels (i.e., secure communication channels) 130. Each respective backup copy manager 122 is also operatively coupled to a corresponding application host server 124 and application data storage system 126.

As will be explained in further detail herein, each backup copy manager 122 is configured to manage generation of a backup data copy (i.e., snapshot) of one or more applications executing on host servers of data center 120, while application and storage monitoring manager 110 is configured to manage functionalities associated with monitoring such applications as well as monitoring storage systems of data center 120 used to store data associated with such applications. Further, backup copy managers 122 and application and storage monitoring manager 110 are configured to provide backup workload prediction and notification functionalities as will be further explained herein.

As further shown in FIG. 1, data center 120 comprises a set of application host servers 124-1, 124-2, 124-3, ..., 124-N (collectively referred to as application host servers 124 or individually as application host server 124). A host server is an example of what may be referred to herein, more generally, as a "host" or a "host device." It is to be understood that each application host server 124 executes one or more applications and has its own application data storage associated therewith. A subset of the application host servers 124 may have a different operating system (OS) from one or more other subsets of the application host servers 124. Further, one or more of the application host servers 124 may be part of a different cloud platform than one or more of the other application host servers 124. Application data storage for the host servers is depicted in FIG. 1 as a set of application data storage systems 126-1, 126-2, 126-3, ..., 126-N (collectively referred to as application data storage systems 126 or individually as application data storage system 126). While each application host server 124 is shown as having its own application data storage system 126, in alternative embodiments, two or more of the application host servers 124 may have respective application data storage areas in the same application data storage system 126. Further, a given backup copy manager 122 may manage backup copies associated with more than one application host server 124 and/or application data storage system 126. Also, the fact that each of backup copy managers 122, application host servers 124, and application data storage systems 126 are shown as comprising a quantity of N, alternative embodiments of data center 120 can include a different number of backup copy managers 124, a different number of application host servers 124, and/or a different number of application data storage systems 126.

In illustrative embodiments, the application data storage systems 126 can be configured in a logical storage unit (LUN) based storage configuration where the application host servers 124 execute applications and application data volumes (including data and/or metadata) generated in accordance with the execution of the applications are stored on the application data storage systems 126 in the form of LUNs. In some embodiments, each application data storage system 126 contains LUN storage resources that provide application host servers 124 with access to general purpose block-level storage through network-based Internet Small Computer Systems Interface (iSCSI) and/or Fibre Channel (FC) protocols. With LUN storage, addressable partitions of block storage resources can be managed so that application host servers 124 can use the LUN resources over FC or Internet Protocol (IP) connections. More particularly, after an application host server 124 connects to a LUN, it can use the LUN similar to a local storage drive. In further embodiments, an application data storage system 126 may comprise one or more storage arrays wherein a storage array may comprise a set of storage drives implemented in a Redundant Array of Independent Disks (RAID) based configuration. The storage array may comprise a storage controller. Numerous other interfaces and associated communication protocols can be used in other embodiments.

It is to be understood that, in illustrative embodiments, each LUN is a block of storage that can stand alone or otherwise be associated with a consistency group. A consistency group is an addressable instance of LUN storage that can contain one or more LUNs and is associated with one or more attached application host servers 124. Consistency groups help organize the storage allocated for a particular host server or host servers. Snapshots or other copies taken of a consistency group apply to all LUNs associated with the group.

It is to be further appreciated that storage devices of the storage arrays may illustratively comprise solid state drives (SSDs). Such SSDs in some embodiments are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of storage devices may also be used. For example, hard disk drives (HDDs) can be used in combination with or in place of SSDs or other types of NVM devices.

A given storage system as the term is broadly used herein can therefore include a combination of different types of storage devices, as in the case of a multi-tier storage system comprising, for example, a memory-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives, NVM drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, NVM drives, hybrid drives or other types of storage devices.

In some embodiments, one or more of application data storage systems 126 illustratively comprises one or more Unity™ or PowerMax™ storage arrays, commercially available from Dell Technologies. As another example, one or more application data storage systems 126 may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

A given storage system as the term is broadly used herein can additionally or alternatively comprise, for example, network-attached storage (NAS), direct-attached storage (DAS) and distributed DAS.

Other additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The application data storage systems 126 in some embodiments may be implemented as part of cloud infrastructure in the form of a cloud-based system such as an Amazon Web Services (AWS) system. Other examples of cloud-based systems that can be used to provide at least portions of the application data storage systems 126 and possibly other portions of system 100 include Google Cloud Platform (GCP) and Microsoft Azure.

As is apparent from the foregoing, terms such as "storage array" and "storage system" as used herein are intended to be broadly construed, and a given such storage array or storage system may encompass, for example, multiple distinct instances of a commercially-available storage array.

Note also that while each backup copy manager 122 is shown in FIG. 1 as functionally separate from application host servers 124 and application data storage system 126, it is to be appreciated that an instance of the backup copy manager 122 can be implemented on each of the application host servers 124 and/or in a storage controller (not expressly shown) of each of the application data storage systems 126. Still further, while multiple backup copy managers 122 are shown in FIG. 1, in alternative embodiments, one backup copy manager 122 can manage backup copy operations for two or more application host servers 124/application data storage systems 126. Further implementations are contemplated in alternative embodiments.

Note further that application and storage monitoring manager 110 is shown in FIG. 1 as functionally separate from the data center 120 since, in this illustrative embodiment, it is intended to be centralized (e.g., in some embodiments, implemented on a dedicated server operatively coupled to the data center 120). However, in alternative embodiments, application and storage monitoring manager 110 may be implemented on one or more application host servers 124 and/or one or more application data storage systems 126. Still further, application and storage monitoring manager 110 can be implemented on a processing device that is part of data center 120 or on one or more processing devices that implement one or more backup copy managers 122. Further implementations are contemplated in alternative embodiments.

In some embodiments, one or more of backup copy managers 122 implement one or more CDM applications such as, but not limited to, PowerProtect Data Manager (PPDM) and/or AppSync (each commercially available from Dell Technologies Inc.). Application and storage monitoring manager 110, in some embodiments, implements one or more centralized applications such as, but not limited to, a Hosted SaaS (Software-as-a-Service) application such as CloudIQ (commercially available from Dell Technologies Inc.) and/or Site Recovery Manager (SRM, commercially available from VMWare Inc.). In some embodiments, each backup application running in each backup copy manager 122 and the monitoring application running in application and storage monitoring manager 110 communicate via a secure network tunnel 130, e.g., Virtual Private Network (VPN), Secure Shell (SSH), etc.

Figure 2A:
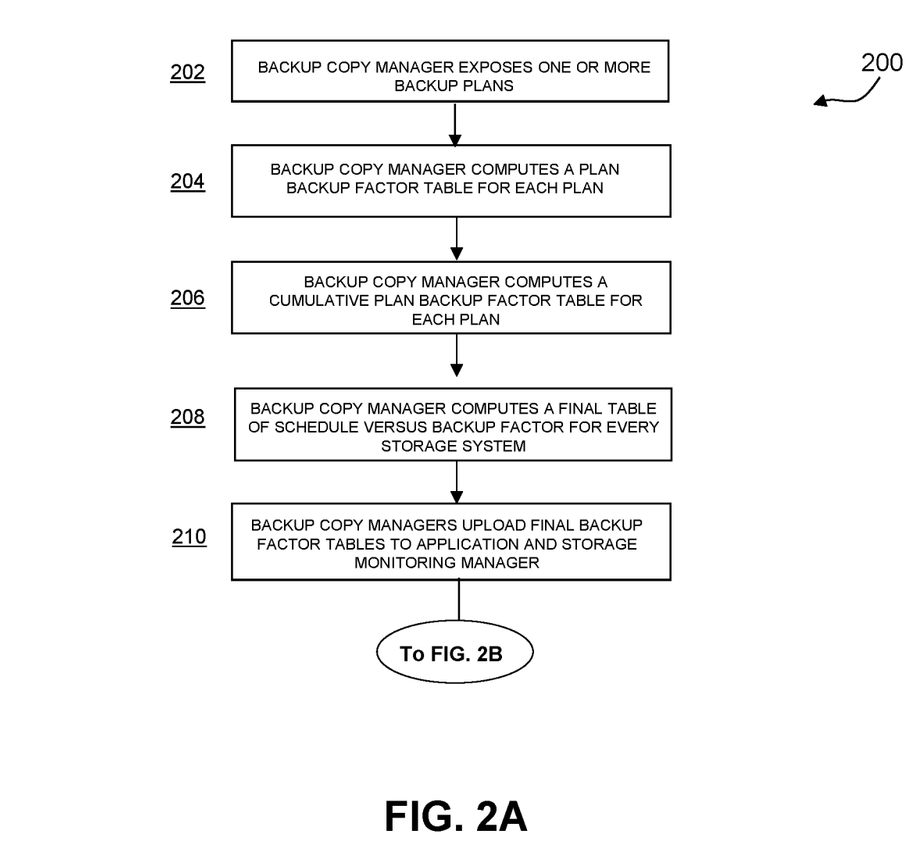
FIGS. 2A and 2B illustrate a methodology for providing backup workload prediction and notification functionalities according to an illustrative embodiment.
Figure 2B:
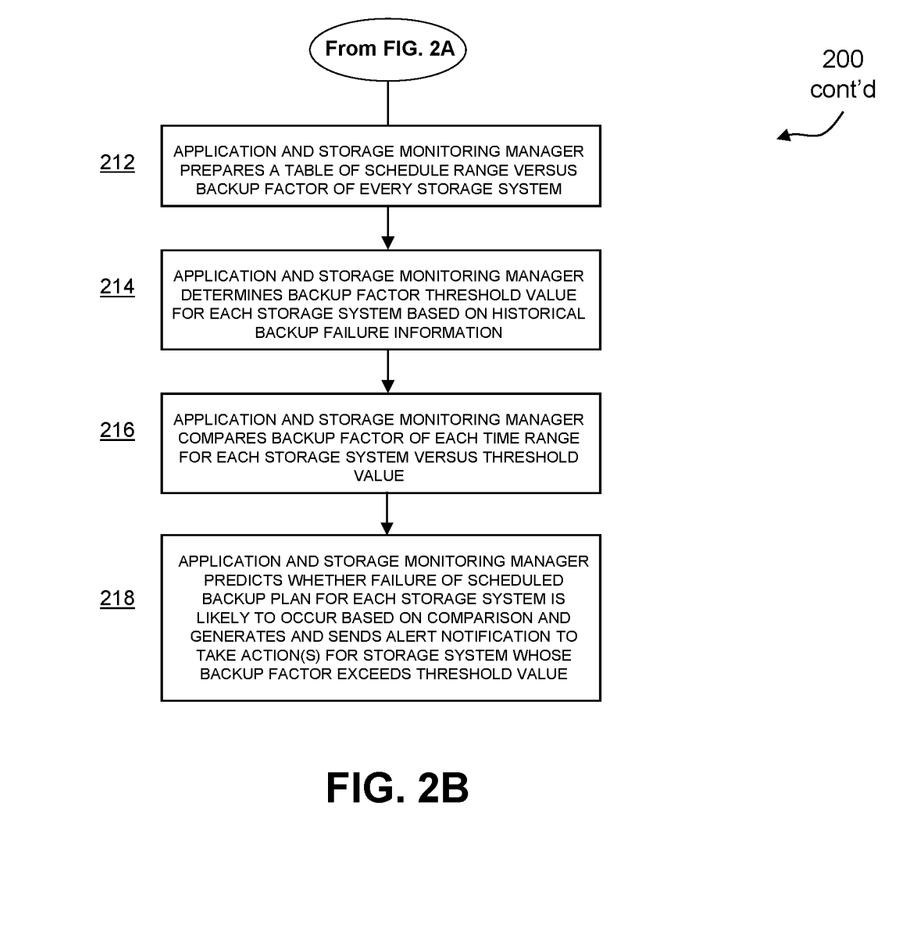

FIG. 2A and FIG. 2B illustrate a methodology 200 for providing backup workload prediction and notification functionalities according to an illustrative embodiment. While FIGS. 2A and 2B may be implemented with other system configurations, illustrative reference will be made to system 100 of FIG. 1. As will be explained in further detail, methodology 200 collects data and then runs an analysis to predict the workload and then take action as needed. Note that FIG. 2A depicts details of steps executed by each of the backup copy managers 122, while FIG. 2B depicts detailed steps executed by the application and storage monitoring manager 110.

In step 202, each backup copy manager 122 (e.g., executing a backup or CDM application) exposes (e.g., makes available for consideration) one or more backup plans which are used by a backup administrator and application owner to subscribe one or more applications executing on the corresponding application host server 124 to obtain a regular backup copy of the application data stored on the corresponding underlying application data storage system 126, depending on the schedule/frequency specified in the plan.

Each exposed backup plan is tied to a schedule for executing a corresponding backup job. Based on the schedule, a backup job will be triggered and in accordance with its schedule, a backup is created (and the previous backup is expired) on the underlying application data storage system 126 where application data is stored, creating a load on the underlying application data storage system 126.

An application associated with an application host server 124 is composed of one or more LUNs and consistency groups. Recall, as mentioned above, a consistency group is an addressable instance of LUN storage that can contain one or more LUNs and is associated with one or more attached application host servers 124. Consistency groups help organize the storage allocated for a particular host server or host servers. Snapshots or other copies taken of a consistency group apply to all LUNs associated with the group. Typically, snapshots/backups are triggered at the LUN or consistency group level. Assume each LUN/volume which is involved in the backup is referred to as a "storage unit" and a backup factor of 1 is assigned for every storage unit. By way of example, if an application's data is hosted on ten volumes, its backup factor is 10.

Figure 3A:
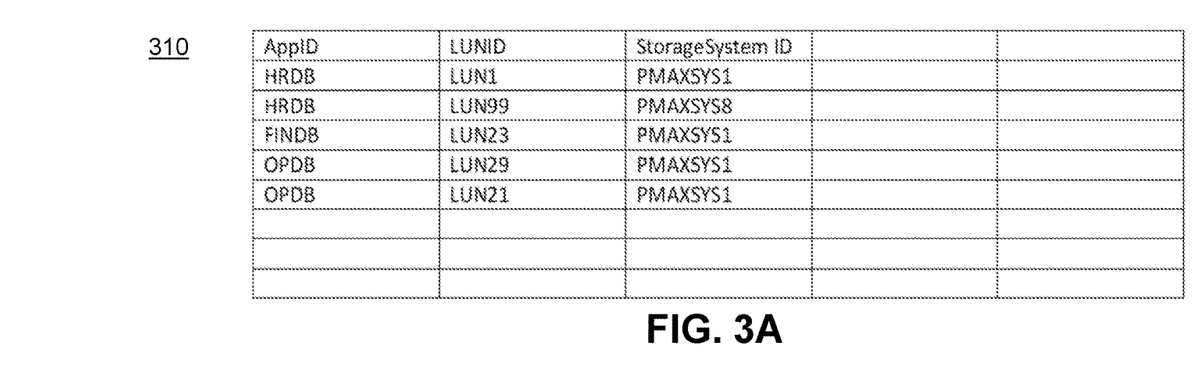
FIGS. 3A through 3C illustrate examples of tables used for backup workload prediction and notification functionalities according to one or more illustrative embodiments.

Accordingly, for each backup plan, a backup copy manager 122 computes its backup factor by decomposing every application to the underlying storage units and computing the backup factor of all the applications which are subscribed to the given plan, and then processing the backup factor by splitting it per storage system. This becomes the backup plan backup factor, or PBF (Plan Backup Factor). Thus, in step 204, each backup copy manager 122 computes a plan backup factor table for each given backup plan. FIG. 3A illustrates a plan backup factor (PBF) table 310 for a given backup plan with a settable start time instance at T1 on a given date DDMMYY (date DD, month MM, year YY). Such a table is created for each plan in step 204. Note that table 310 in FIG. 3A (as well as the tables in the subsequent figures) is only an example of a data structure in which such information can be stored and, therefore, alternative data structures can be used.

Thus, in this illustrative embodiment, table 310 specifies an application identifier (AppID), LUN identifier (LUNID), and a Storage System identifier (StorageSystemID). By way of example only, based on information specified in the rows of table 310, data for an HRDB (human resources database) application is stored in LUN1 on a first application data storage system 126 identified as PMAXSYS1, while the same HRDB application data is also stored in LUN99 on a second application data storage system 126 identified as PMAXSYS8. Alternatively, two separate portions of the HRDB application data can be stored on each storage system. Furthermore, as table 310 specifies, storage system PMAXSYS1 also stores three other LUNs for data of other applications associated with the given backup plan, i.e., FINDB application data on LUN23, and OPDB application data on LUN21 and LUN29.

Figure 3B:
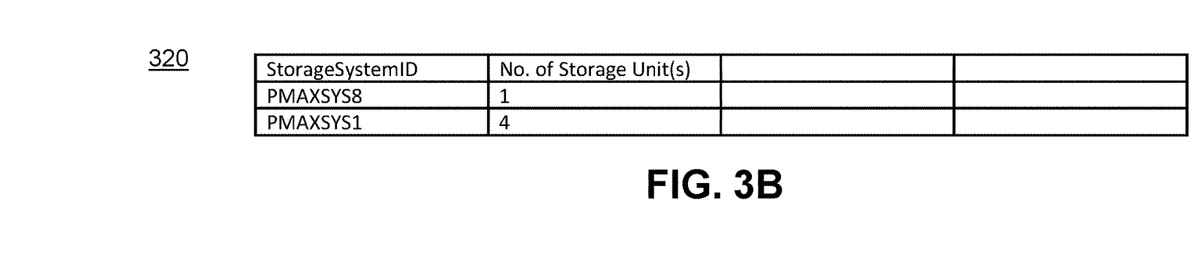

In step 206, table 310 is processed and converted by the backup copy manager 122 to create a cumulative backup factor table 320 per application data storage system 126 for the given backup plan, as shown in FIG. 3B. As shown, since PMAXSYS1 has application data that is subject to the given backup plan on four separate volumes (LUNs), then the number of storage units (as defined above) for PMAXSYS1 is 4. Similarly computed, the number of storage units for PMAXSYS8 is 1. Such a table is created for each plan in step 206.

Figure 3C:
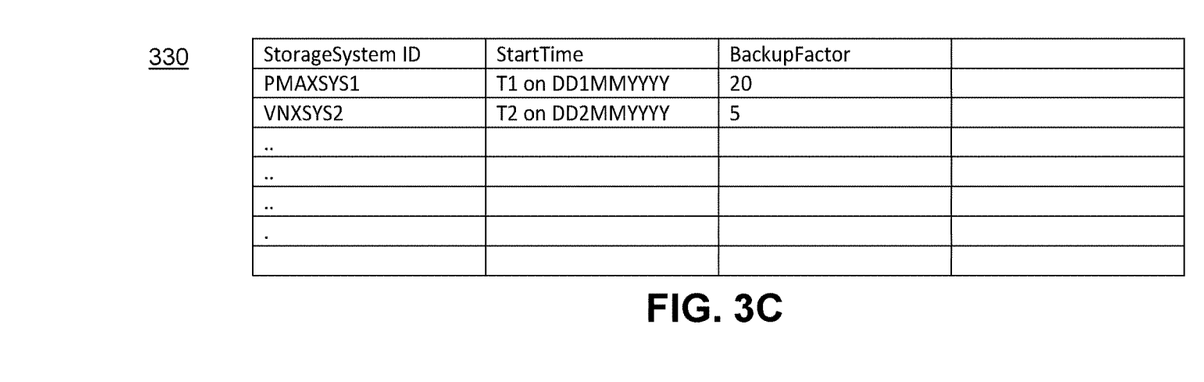

The backup copy manager 122, in step 208, creates a final table of schedule versus backup factor for every application data storage system 126 from the tables for each plan created in step 206. FIG. 3C depicts an example of a final table 330. Note, for example, that storage unit PMAXSYS1 shows a backup factor of 20 in table 330. Recall that, as explained above, the backup factor is equivalent to the number of storage units. Thus, while table 320 in FIG. 3B shows PMAXSYS1 listed as having four storage units, it is to be appreciated that those storage units (LUN/volumes) are associated with a backup plan associated with applications HRDB, FINDB and OPDB. However, it is to be understood that the application data storage system 126 identified as PMAXSYS1 stores data (in LUNs/volumes) for applications associated with other backup plans. Thus, as shown in table 330, PMAXSYS1 has a total backup factor of 20 (i.e., 20 LUNs/volumes will be included in the scheduled backups for that specific application data storage system 126). Also listed in table 330 is the total backup factor for another storage system VNXSYS2. It is to be understood that when there are multiple backup copy managers 122 (as illustrated in FIG. 1), each backup copy manager 122 is associated with a given application host server 124 which is associated with one or more application data storage systems 126. Thus, each backup copy manager 122 in FIG. 1 generates a final backup factor table such as shown in table 330. The backup factors in the final tables may be considered examples of a set of one or more values representing a backup plan factor respectively corresponding to a set of one or more storage systems upon which data associated with the execution of application programs on one or more host servers coupled to the set of storage systems is stored.

In step 210, the backup copy managers 122 upload final backup factor tables 330 or information therein to the centralized application and storage monitoring manager 110 which, in an illustrative embodiment, is executing a monitoring application such as, e.g., CloudIQ running on an SaaS platform.

Application and storage monitoring manager 110 (e.g., monitoring application) analyzes the data uploaded from each backup copy manager 122 at regular intervals of time for each and every application data storage system 126. More particularly, application and storage monitoring manager 110 processes a given time period (e.g., one month) view of the backup plans versus the backup factor data uploaded by the multiple backup copy managers 122.

FIG. 2B illustrates steps executed by the application and storage monitoring manager 110.

In step 212, application and storage monitoring manager 110 starts with the earliest backup plans based on the uploaded data and prepares a table of schedule range versus backup factor of every application data storage system 126 by processing data from multiple backup copy managers 122. Processing starts with the minimum schedule value and a range defined, e.g., time x+30 minutes where X could be 8:00 AM or 12:00 PM. Thus, application and storage monitoring manager 110 considers all the backup factors falling in the time Range (X+30 minutes) and creates a chart of time range versus backup factor.

In step 214, a threshold value of the backup factor is determined by application and storage monitoring manager 110 for every application data storage system 126 based on analyzing all the past backup failures, e.g., application data storage system 126-1 can only handle a maximum of N number of backup factors (e.g., snap creation/deletion). This historical backup failure information may be obtained from the application data storage systems 126, backup administrators, or some other datacenter source(s) based on tests and/or real-time information. Thus, every application data storage system 126 has its own capability which is used to determine the threshold value of the backup factor which is determined after running tests and analysis. This can also be specified by a setting for each of the application data storage systems 126. For example, PowerMax (commercially available from Dell Technologies Inc.) is capable of snapping up to 100 volumes in a window of 8 to 10 seconds. Other types of storage systems may have different snapshot capabilities, e.g., Unity (commercially available from Dell Technologies Inc.) may be able to snap 12 volumes in an 8 to 10 second window, while XtremlO (commercially available from Dell Technologies Inc.) can be about 12 to 14 volumes in 10 seconds.

In step 216, after preparing a cumulative time range versus backup factor table, application and storage monitoring manager 110 scans thru all the time ranges and compares the backup factor of each time range versus the threshold value.

If application and storage monitoring manager 110 detects any backup factor above this threshold value, in step 218, application and storage monitoring manager 110 predicts that the scheduled backup will (or rather is likely to) fail since the backup factor exceeds the threshold value (and, for example, from historical data, such an occurrence led to a previous backup failure). Application and storage monitoring manager 110 then generates an alert notification for the application data storage system 126 and sends it to the backup application administrator as well as the storage system administrator, and/or to some other datacenter system (more generally, an entity configured to or otherwise capable of taking one or more preventative actions). Alert notifications contain details about the time range and the backup factor of the workload, so that the administrator and/or system can take one or more preventative actions, e.g., modify the scheduled backup task, reschedule the scheduled backup task, cancel the scheduled backup task, etc. Still other actions can be taken depending on the circumstances.

The particular processing operations and other system functionality described in conjunction with FIG. 1-3C are presented by way of illustrative example only, and should not be construed as limiting the scope of the disclosure in any way. Alternative embodiments can use other types of processing operations involving host devices, storage systems and snapshot creation functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of synchronized snapshot arrangements within a given information processing system.

Functionality such as that described in conjunction with the flow diagrams of FIGS. 2A and 2B can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system described herein may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components described herein can be implemented for use by tenants of such a multi-tenant environment.

As mentioned previously, cloud infrastructure as disclosed herein can include cloud-based systems. Virtual machines provided in such systems can be used to implement illustrative embodiments. These and other cloud-based systems in illustrative embodiments can include object stores.

Illustrative embodiments of processing platforms will now be described in greater detail with reference to FIGS. 4 and 5.

Figure 4:
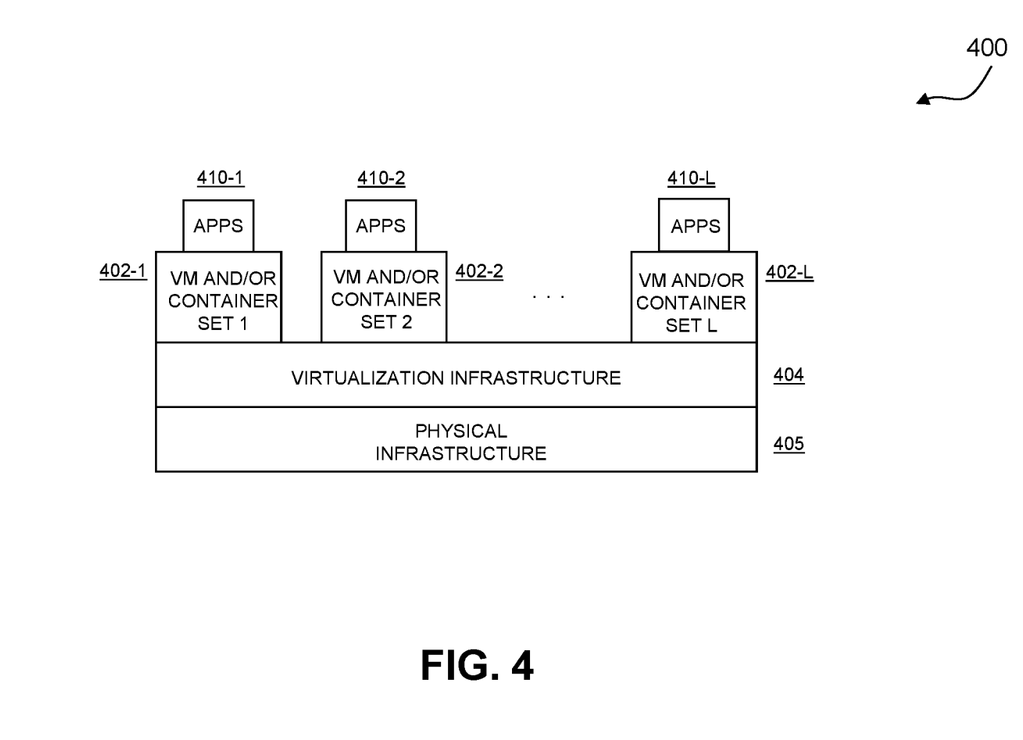
FIGS. 4 and 5 illustrate examples of processing platforms that may be utilized to implement at least a portion of an information processing system with backup workload prediction and notification functionalities according to one or more illustrative embodiments.
Figure 5:
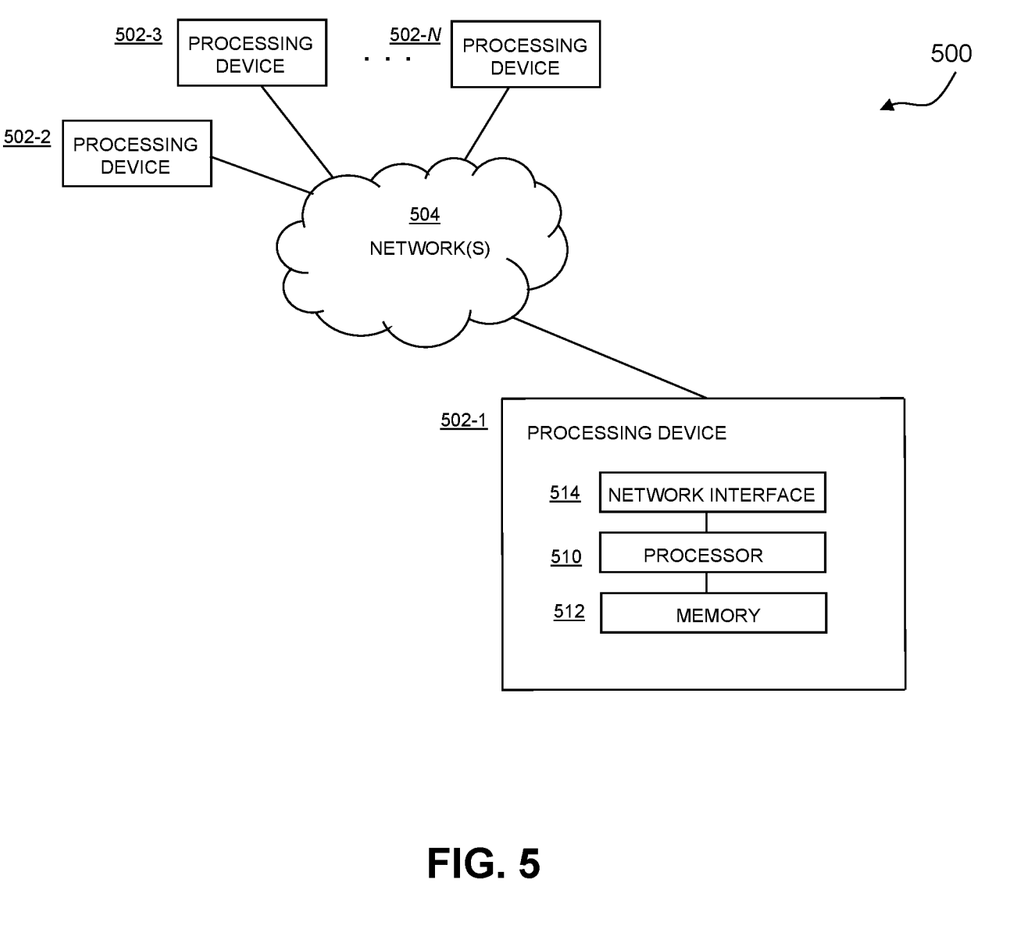

FIG. 4 shows an example processing platform comprising cloud infrastructure 400. The cloud infrastructure 400 comprises a combination of physical and virtual processing resources that may be utilized to implement at least a portion of the information processing systems described herein. The cloud infrastructure 400 comprises multiple virtual machines (VMs) and/or container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure. The operating system level virtualization infrastructure illustratively comprises kernel control groups of a Linux operating system or other type of operating system.

The cloud infrastructure 400 further comprises sets of applications 410-1, 410-2, . . . 410-L running on respective ones of the VMs/container sets 402-1, 402-2, . . . 402-L under the control of the virtualization infrastructure 404. The VMs/container sets 402 may comprise respective VMs, respective sets of one or more containers, or respective sets of one or more containers running in VMs.

In some implementations of the FIG. 4 embodiment, the VMs/container sets 402 comprise respective VMs implemented using virtualization infrastructure 404 that comprises at least one hypervisor. A hypervisor platform may be used to implement a hypervisor within the virtualization infrastructure 404, where the hypervisor platform has an associated virtual infrastructure management system. The underlying physical machines may comprise one or more distributed processing platforms that include one or more storage systems.

In other implementations of the FIG. 4 embodiment, the VMs/container sets 402 comprise respective containers implemented using virtualization infrastructure 404 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of system 100 and includes a plurality of processing devices, denoted 502-1, 502-2, 502-3, . . . 502-N, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512. The processor 510 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the FIG. 1 system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory, the at least one processing device, when executing program code, is configured to:
obtain, by a centralized application and storage manager, multiple sets of one or more values representing multiple backup plan factors respectively corresponding to multiple storage systems upon which data associated with the execution of application programs on one or more host servers coupled to the multiple storage systems is stored;
compare, by the centralized application and storage manager, the multiple sets of one or more values with multiple sets of one or more threshold values associated with the multiple storage systems; and
predict, by the centralized application and storage manager, whether a scheduled backup plan corresponding to each of the multiple storage systems is likely to fail based on a result of comparing the multiple sets of one or more values representing multiple backup plan factors with respective multiple sets of one or more threshold values associated with the multiple storage systems.

2. The apparatus of claim 1, wherein the processing device, when executing program code, is further configured to generate an alert notification for a given one of the multiple storage systems for which a scheduled backup plan is predicted to fail.

3. The apparatus of claim 2, wherein the processing device, when executing program code, is further configured to send the alert notification to an entity to cause one or more preventative actions to be taken.

4. The apparatus of claim 3, wherein the one or more preventative actions comprise one or more of modifying a scheduled backup plan, rescheduling a scheduled backup plan, and canceling a scheduled backup plan.

5. The apparatus of claim 1, wherein the backup plan factor represented by one or more values for a given one of the multiple storage systems comprises a number of storage units upon which data associated with the execution of application programs on the one or more host servers coupled to the given one of the multiple storage systems is stored.

6. The apparatus of claim 5, wherein a storage unit corresponds to a logical storage unit associated with the given one of the multiple storage systems.

7. The apparatus of claim 5, wherein a storage unit corresponds to a volume associated with the given one of the multiple storage systems.

8. The apparatus of claim 1, wherein the processing device, when executing program code, is further configured to determine the multiple sets of one or more threshold values from information associated with one or more previous backup plan executions for the multiple storage systems.

9. The apparatus of claim 1, wherein the multiple sets of one or more values representing multiple backup plan factors respectively corresponding to the multiple storage systems is obtained from one or more backup copy managers associated with the one or more host servers and the multiple storage systems.

10. The apparatus of claim 9, wherein the one or more backup copy managers are configured to compute the multiple sets of one or more values from one or more data structures comprising information specifying application identifiers, storage unit identifiers and storage system identifiers.

11. The apparatus of claim 10, wherein the one or more backup copy managers communicate with the apparatus via one or more secure communication channels.

12. A method comprising:
obtaining, by a centralized application and storage manager, multiple sets of one or more values representing multiple backup plan factors respectively corresponding to multiple storage systems upon which data associated with the execution of application programs on one or more host servers coupled to the multiple storage systems is stored;
comparing, by the centralized application and storage manager, the multiple sets of one or more values with multiple sets of one or more threshold values associated with the multiple storage systems; and
predicting, by the centralized application and storage manager, whether a scheduled backup plan corresponding to each of the multiple storage systems is likely to fail based on a result of comparing the multiple sets of one or more values representing multiple backup plan factors with respective multiple sets of one or more threshold values associated with the multiple storage systems, wherein the steps are performed by at least one processing device comprising a processor coupled to a memory executing program code.

13. The method of claim 12, further comprising:

generating an alert notification for a given one of the multiple storage systems for which a scheduled backup plan is predicted to fail; and sending the alert notification to an entity to cause one or more preventative actions to be taken.

14. The method of claim 13, wherein the one or more preventative actions comprise one or more of modifying a scheduled backup plan, rescheduling a scheduled backup plan, and canceling a scheduled backup plan.

15. The method of claim 12, wherein the backup plan factor represented by the one or more values for a given one of the multiple storage systems comprises a number of storage units upon which data associated with the execution of application programs on one or more host servers coupled to the given one of the multiple storage systems is stored.

16. The method of claim 12, further comprising determining the set of one or more threshold values from information associated with one or more previous backup plan executions for the multiple storage systems.

17. The method of claim 12, wherein the multiple sets of one or more values representing multiple backup plan factors respectively corresponding to the multiple storage systems is obtained from one or more backup copy managers associated with the one or more host servers and the multiple storage systems.

18. The method of claim 17, wherein the one or more backup copy managers are configured to compute the multiple sets of one or more values from one or more data structures comprising information specifying application identifiers, storage unit identifiers and storage system identifiers.

19. A computer program product comprising a non-transitory processor-readable storage medium having stored therein program code of one or more software programs, wherein the program code when executed by at least one processing device causes the at least one processing device to:

obtain, by a centralized application and storage manager, multiple sets of one or more values representing multiple backup plan factors respectively corresponding to multiple storage systems upon which data associated with the execution of application programs on one or more host servers coupled to the multiple storage systems is stored;

compare, by the centralized application and storage manager, the multiple sets of one or more values with multiple sets of one or more threshold values associated with the multiple storage systems; and predict, by the centralized application and storage manager, whether a scheduled backup plan corresponding to each of the multiple storage systems is likely to fail based on a result of comparing the multiple sets of one or more values representing multiple backup plan factors with respective multiple sets of one or more threshold values associated with the multiple storage systems.

20. The computer program product of claim 19, wherein the program code when executed by the at least one processing device further causes the at least one processing device to:

generate an alert notification for a given one of the multiple storage systems for which a scheduled backup plan is predicted to fail; and send the alert notification to an entity to cause one or more preventative actions to be taken.

\* \* \* \* \*